April 8, 1947.  W. MANN  2,418,719
BRAKE ELEMENT
Filed Aug. 31, 1944

INVENTOR.
William Mann
BY John P. Tooley
ATTORNEY

Patented Apr. 8, 1947

2,418,719

UNITED STATES PATENT OFFICE 2,418,719

BRAKE ELEMENT

William Mann, Grosse Pointe, Mich., assignor to The Budd Company, Philadelphia, Pa., a corporation of Pennsylvania Application August 31, 1944, Serial No. 552,131

4 Claims. (Cl. 188—251)

The invention relates to a brake element having a lining of the composition type.

Such brake elements as composition brake shoes cooperating with an opposed rotary brake element are commonly comprised of a metal backing to which the composition lining is secured. Some such composition linings are relatively hard and unyielding, but at the same time may possess superior braking and wear resisting characteristics. If such linings are attached directly to the backing, because of their relatively unyielding character, it may happen that the pressures applied to the shoe backing are not equally distributed to the wearing face of the lining, with the result that extremely high temperatures are developed in localized regions of excessively high pressure, which may result not only in producing heat checks in the rotary brake elements, which are undesirable, but also increase the wear of the lining due both to the higher temperatures and the presence of heat checks.

It has, heretofore, been proposed to equalize the pressure on the working face of the lining by employing a rubber cushion between the lining and the metal backing and this has eliminated these difficulties for the most part. However, the rubber cushion was likely to deteriorate in time due to the high temperatures to which it was subjected in use, and also due to rapid change in temperature to which it was subjected in its use on vehicles, such as railroad trains, operating in regions where the normal temperature ranged from below zero to over 100° Fahrenheit and the braking temperature between the lining and rotary brake element might rise up to 800° or more. Furthermore, if the lining was not changed before it wore quite thin, this differential temperature effect on the rubber was still more marked. To overcome these defects of the rubber backing and at the same time retain its advantages, and provide still other advantages, forms an object of the present invention.

This object is attained by a brake element or shoe having secured to its metal backing a lining varying in its characteristics from the face of the backing to the wear face of the lining, the layer of lining adjacent the shoe being relatively soft and yielding, while the layer adjacent the wear face being relatively hard and unyielding and having superior braking and wear resisting qualities. The yielding layer acts similarly to the rubber formerly used in distributing the braking pressure evenly upon the wear face of the lining from the backing plate, at the same time it is not subject to the deterioration of the rubber due to the great and sudden changes of temperature encountered in service. Yet more, the outer wear-resisting and harder layer can be worn down further before requiring replacement without affecting the cushioning layer of lining and braking may still be had even if all the outer layer is worn down by braking on the more yielding layer. Thus longer time between replacement of the outer layer of the lining is made possible and this without running the danger of deleteriously affecting the cushioning inner layer adjacent the backing plate.

Furthermore, with this arrangement the outer layer, when worn down, may readily be replaced by simply cementing a new layer to the unused part of the multilayer lining.

Other and further objects and advantages and the manner in which they are attained will become clear from the following detailed description when read in connection with the drawings forming a part of this specification.

Figure 1:
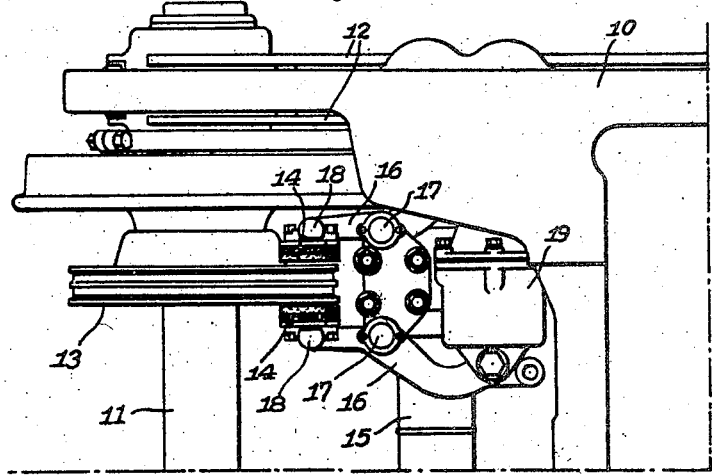
Fig. 1 shows one manner of application of the brake element of the invention, this view being a plan view of one-quarter of a railway truck having a brake applied to its wheel and axle assembly.

The invention has been shown applied in Fig. 1 to a railway truck having a frame 10 spring supported from a wheel and axle assembly 11 through equalizer bars 12. The wheel and axle assembly carries a brake disc 13 the opposite faces of which are engageable by the spaced segmental shoes 14 which are carried from a support yoke 15 by levers 16 pivoted at 17, on the support and pivotally connected to the shoes, at 18. The actuating means for the levers may comprise a fluid pressure cylinder 19 disposed between the ends of the levers opposite the ends thereof carrying the shoes, and operative to press the shoes in braking engagement with the disc, when fluid pressure is supplied to the cylinder in a usual manner.

It is understood, of course, that this embodiment of the invention is merely illustrative, for the invention may be used in widely different brake embodiments.

Figure 2:
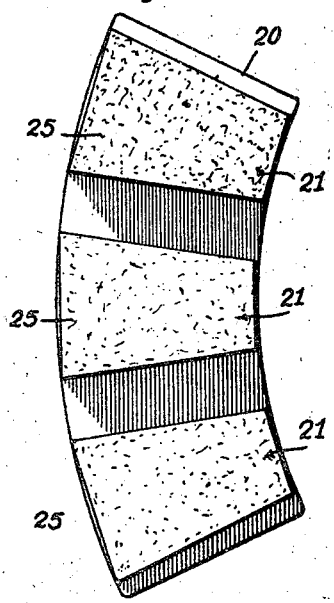
Fig. 2 is a face view of a brake shoe according to the invention.
Figure 3:
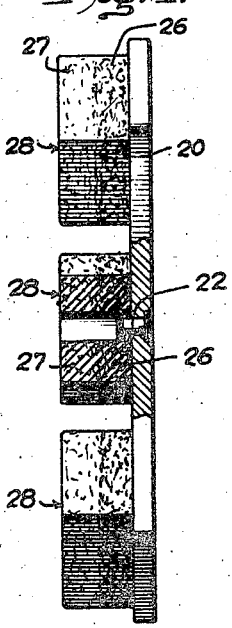
Fig. 3 is an edge view of the shoe, with parts broken away to show a detail.

As shown in Figs. 2 and 3, the shoe 14 comprises the metal backing 20, of arcuate form against one face of which is secured a composition lining. In the embodiment shown, this lining is constituted of spaced keystone-shaped blocks 21 extending across the width of the backing plate and rigidly secured thereto, as by rivets 22, one of which is indicated in Fig. 3. Other means of securing the blocks to the backing plate may be employed.

According to the invention each lining block is constituted of an inner layer or lamination 23 of composition lining material adjacent the backing plate and secured thereto through the rivets 22, or otherwise. To this inner layer is strongly cemented, as indicated at 24, an outer layer 25 of composition lining material.

The lining material of the two layers differs in yieldability and hardness and preferably also differs in wear resisting qualities, the inner layer 23, for the purposes of the invention, to enable it to serve as a cushioned support for the outer layer 25 from the backing, being relatively soft and yielding in character. The outer layer 25, on the other hand, to enable it to resist wear, is relatively hard and unyielding in character. As shown, the two layers are substantially equal in thickness, but this particular thickness relation may be changed without departing from the invention.

With this arrangement, it will be seen that the inner layer cushions the outer layer and allows it to adjust its wear face to the rotary brake element with substantially equal pressure throughout. At the same time, the yielding inner layer of composition lining is able to withstand the heat normally encountered in braking and may even itself become the wear face of the lining if the outer harder, wear resisting material is worn off. This makes it possible to wear down the outer layer 25 almost to, or to, the face of the inner layer before replacement and replacement can be effected by simply cementing a new layer in place on the remainder of the worn lining. At the same time, if the wear should proceed beyond the outer layer before replacement was made, no harm would result, since the brakes would still be effective through the engagement of the inner layer with the rotary brake member.

Figure 4:
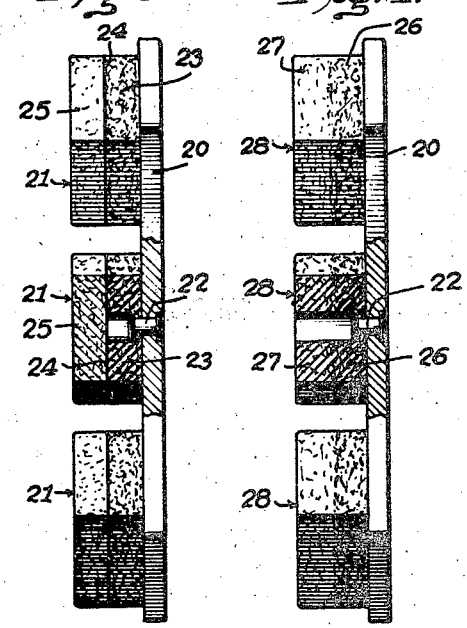
Fig. 4 is a view similar to Fig. 3 showing a slight modification.

According to the form shown in Fig. 4, the inner and outer layers 26 and 27 may be molded, if desired, in a single block, 28, the inner lamination of which has the soft and yielding characteristics similar to the block 23 of the preferred form and the outer lamination 29 of which has the hard and unyielding characteristics of the outer layer 25 of the preferred form. In this case the holes for receiving the rivets 22 will have to be extended to the braking face of the outer layer 27, as shown, where rivets are used as the securing medium.

While several specific embodiments of the invention have been shown and described and the invention has been applied to a railway brake, it will be understood that changes and modifications may be made in the specific embodiments shown and the invention may be applied in other relations without departing from the main features thereof, and such changes and modifications are intended to be covered in the appended claims.

What is claimed is:

1. A brake element having a rigid metal backing, a composition brake lining secured to said backing and having braking effectiveness for substantially its entire thickness, and means securing said lining to the backing, said lining having varying characteristics in the direction of its thickness, the portion of the lining adjacent the backing having the characteristic of being relatively soft and yielding and the portion of the lining adjacent the braking face having the characteristic of being relatively hard and unyielding, and said means securing the lining to the backing terminating short of the outer face of said portion of the lining adjacent the backing.

2. A brake element having a rigid metal backing, a composition brake lining secured to said backing and having braking effectiveness for substantially its entire thickness, and means securing said lining to the backing, said lining comprising a laminated structure including at least two laminae, one lamina next to the backing being relatively soft and yielding and one next to the braking face being relatively hard and wear-resisting, and said means securing the lining to the backing being associated solely with said lamina next to the backing.

3. A brake element having a rigid metal backing, a first layer of composition brake lining secured to said backing, means securing it to the backing of an extent from said backing materially less than the thickness of said layer and a second layer of composition brake lining cemented to said first layer, the first layer being relatively soft and compressible and the second said layer being relatively hard and less compressible than said first layer.

4. A brake element having a rigid metal backing, a composition brake lining of substantial thickness secured thereto and having braking effectiveness for substantially its entire thickness, and means for securing said lining to the backing, about half the thickness of said lining lying adjacent the backing being relatively soft and yielding and the remainder of the thickness of said lining being relatively hard and wear resisting, and said securing means for said lining terminating short of said half the lining thickness.

WILLIAM MANN.

REFERENCES CITED

The following references are of record in the file of this patent:

UNITED STATES PATENTS

| Number | Name | Date |
|---|---|---|
| 1,784,994 | Morris | Dec. 16, 1930 |
| 2,158,337 | Rasmussen | May 16, 1939 |
| 2,033,968 | Fether | Mar. 17, 1936 |
| 2,134,744 | Wales | Nov. 1, 1938 |